United States Patent
Kang et al.

(10) Patent No.: US 9,796,595 B2
(45) Date of Patent: Oct. 24, 2017

(54) POROUS BORON NITRIDE AND METHOD OF PREPARING THE SAME

(71) Applicants: Hanwha Chemical Corporation, Seoul (KR); SNU R&DB Foundation, Seoul (KR)

(72) Inventors: Shin Hoo Kang, Seoul (KR); Ji Soon Ihm, Seoul (KR); Dong Ok Kim, Seoul (KR); Jin-Hong Kim, Seoul (KR)

(73) Assignees: Hanwha Chemical Corporation (KR); SNU R&DB Foundation (KR)

( * ) Notice: Subject to any disclaimer, the term of this patent is extended or adjusted under 35 U.S.C. 154(b) by 291 days.

(21) Appl. No.: 14/417,296

(22) PCT Filed: Jul. 24, 2013

(86) PCT No.: PCT/KR2013/006639
§ 371 (c)(1),
(2) Date: Jan. 26, 2015

(87) PCT Pub. No.: WO2014/017835
PCT Pub. Date: Jan. 30, 2014

(65) Prior Publication Data
US 2015/0246821 A1    Sep. 3, 2015

(30) Foreign Application Priority Data

Jul. 27, 2012 (KR) ........................ 10-2012-0082716

(51) Int. Cl.
*C01B 35/14*    (2006.01)

(52) U.S. Cl.
CPC ............ *C01B 35/146* (2013.01); *C01B 35/14* (2013.01); *C01P 2006/12* (2013.01); *C01P 2006/14* (2013.01); *C01P 2006/16* (2013.01)

(58) Field of Classification Search
CPC ........................... C01B 35/14; C01B 35/146
See application file for complete search history.

(56) References Cited

U.S. PATENT DOCUMENTS 3,837,997 A    9/1974 Economy et al.
4,014,979 A    3/1977 Dremin et al.
(Continued)

FOREIGN PATENT DOCUMENTS

CN    1323738 A    11/2001
CN    101602497 A   12/2009
(Continued)

OTHER PUBLICATIONS

Partial Supplemental Search Report from European Application No. 13823064.4, dated Apr. 21, 2016.
(Continued)

*Primary Examiner* — Guinever S Gregorio
(74) *Attorney, Agent, or Firm* — Lerner, David, Littenberg, Krumholz & Mentlik, LLP

(57) ABSTRACT

This disclosure relates to porous boron nitride and a method for preparing the same. The porous boron nitride of the present invention may be obtained by mixing a boron source with a nitrogen source, heating the mixture to form a compound, and then, extracting elements other than boron and nitrogen. The porous boron nitride of the present invention comprises both micropores and mesopoers, and it has a large specific surface area, and thus, may be usefully used in various fields.

6 Claims, 2 Drawing Sheets

(56) References Cited

U.S. PATENT DOCUMENTS

| | | | | |
|---|---|---|---|---|
| 5,053,365 A | * | 10/1991 | Shore | C01B 21/064 423/276 |
| 5,169,613 A | * | 12/1992 | Shore | C01B 21/0646 423/284 |
| 2008/0039311 A1 | | 2/2008 | Malenfant et al. | |

FOREIGN PATENT DOCUMENTS

| | | |
|---|---|---|
| EP | 0076731 A2 | 4/1983 |
| EP | 1043410 A1 | 10/2000 |
| JP | H0748105 | 2/1995 |
| JP | H10505053 A | 5/1998 |
| JP | 2004175618 A | 6/2004 |
| JP | 2007031170 A | 2/2007 |
| KR | 19970705529 | 10/1997 |
| WO | 0121393 A1 | 3/2001 |

OTHER PUBLICATIONS

Schlienger, S. et al., Micro-, Mesoporous Boron Nitride-Based Materials Templated from Zeolites. Chem. Mater. Dec. 9, 2011, vol. 24, pp. 88-96.
International Search Report for Application No. PCT/KR2013/006639 dated Oct. 18, 2013.
Gogotsi et al. 1997 J. Mater. Chem.7:1841-1848.
Boehm et al. Proc. 12th Biennial Conf. on Carbon 149-150 (Pergamon, Oxford, 1975).

* cited by examiner

[Fig. 1]
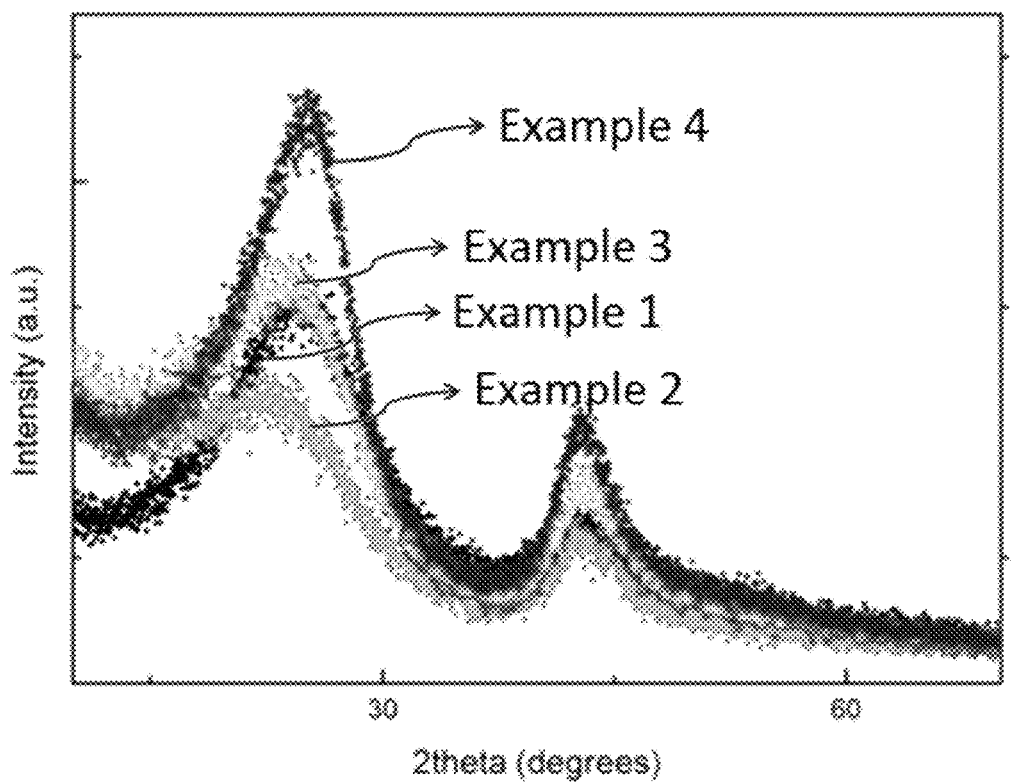

[Fig. 2]
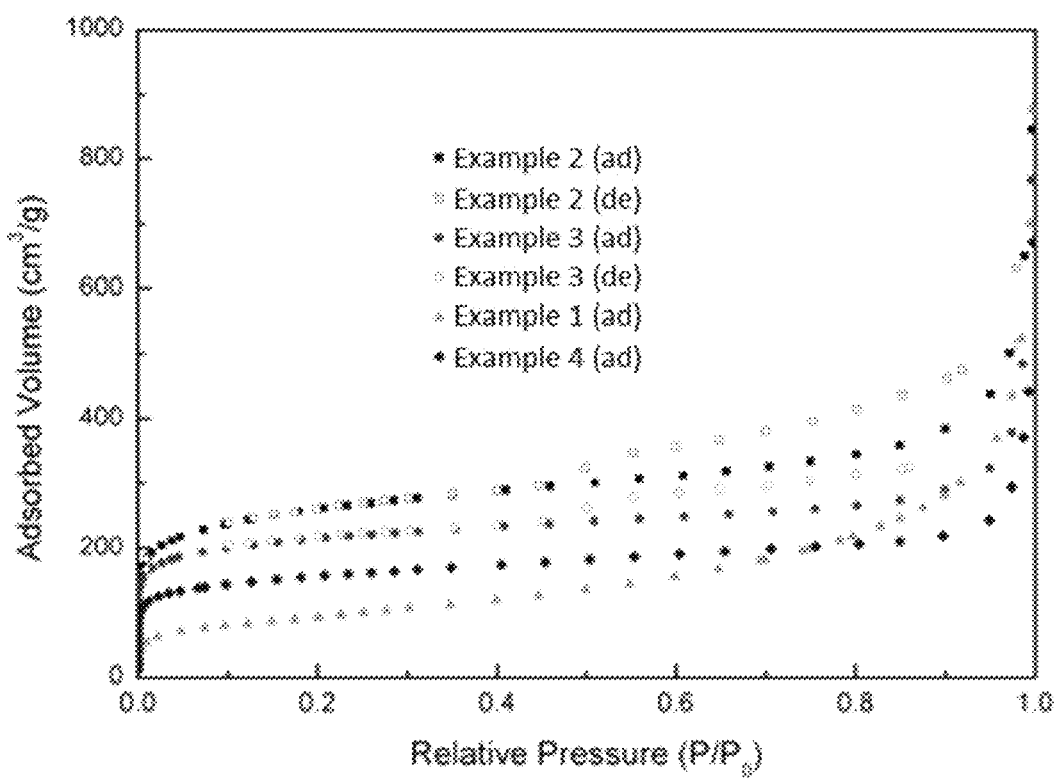

POROUS BORON NITRIDE AND METHOD OF PREPARING THE SAME

CROSS REFERENCE TO RELATED APPLICATION

This application is a national phase entry under 35 U.S.C. §371 of International Application No. PCT/KR2013/006639, filed Jul. 24, 2013, which claims priority to Korean Patent Application No. 10-2012-0082716, filed Jul. 27, 2012, the disclosures of which are incorporated herein by reference.

TECHNICAL FIELD

The present invention relates to porous boron nitride and a method for preparing the same. More particularly, the present invention relates to highly porous boron nitride with high specific surface area, and a method for preparing the same. This application claims the priority of Korean Patent Application No. 10-2012-0082716 filed with the Korean Intellectual Property Office on Jul. 27, 2012, the entire contents of which are hereby incorporated by reference.

BACKGROUND OF ART

Carbon material is very useful material that is applied in many different industries such as a catalyst, a fuel cell, electrode material for a secondary cell, a super capacitor, composite materials, a gas sensor, a solar cell various electronic devices and the like. Carbon is being applied in a great variety of forms.

Particularly, carbon fiber, carbon nanotube and the like have very excellent mechanical properties while having high conductivity, and for active carbon or amorphous carbon with very high specific surface area, due to the high porosity and stable property, a lot of studies are being progressed in the field of electrode material for a fuel cell and a secondary cell. And, it draws attention as gas storage material for fuel such as hydrocarbon and hydrogen and the like, or a separation body that can purify contaminated area or harmful gas such as carbon dioxide and the like Recently, carbide derived carbon (CDC) is studied as porous carbon material and is receiving lots of attention (Gogotsi et al. 1997 *J. Mater. Chem.* 7: 1841-1848: Boehm et al. *Proc. 12th Biennial Conf. on Carbon* 149-150 (Pergamoii, Oxford, 1975). Most amorphous CDC has micropores of 2 nm or less, and thus, it was reported, to selectively produce 0.6~0.9 nm pores that are ideal for hydrogen storage.

However, mesopores of 2 nm or more are also in great demand in various industries such as semiconductor or large gas storage, adsorption body of medical therapeutics or lubricant adsorbent and the like.

Recently, control of pore volume as well as control of specific surface area and pore size draws attention as more important property. Thus, in order to control pores, CDC synthesis was attempted using various raw materials. As the raw materials of CDC, most carbides such as TiC, ZrC, WC, SiC, TaC, $B_4C$, HfC, $Al_4C_3$ and the like were used, but noticeable result according to the kind of metal atoms of carbide was not obtained and CDC that can form mesopores of 2 nm or more has not been reported yet.

Boron nitride (BN) theoretically has bond energy of 1.5 or more times compared to the carbonous materials. This results from hetero-polarity of boron nitride, and the bond energy of carbanous material is 0.05~0.06 ev/atom while the bond energy of BN is 0.09~0.1 ev/atom. A lot of studies have been reported thereon, and a template method and a substitution method are major synthesis methods currently known. However, the specific surface area (SSA) of boron nitrides so far reported is very low compared to carbonons materials. If a measure to effectively increase the specific surface area is secured, boron nitride material could replace various pore materials including carbonous materials.

DETAILED DESCRIPTION OF THE INVENTION

Technical Problem

In order to solve the problems of the prior art, it is an object of the invention to provide porous boron nitride with high specific surface area including micropores and mesopores.

It is another object of the invention to provide a method for preparing the porous boron nitride.

Technical Solution

The present invention provides porous boron nitride comprising micropores with a diameter of less than 2 nm and mesopores with a diameter of 2 to 50 nm.

The present invention also provides a method for preparing porous boron nitride comprising the steps of:
mixing at least one boron source selected from boron or boron-containing compounds with, at least one nitrogen source selected from nitrogen or nitrogen-containing compounds;
healing the mixture and reacting it with halogen gas; and
heating the reaction mixture under hydrogen atmosphere.

BRIEF DESCRIPTION OF THE DRAWINGS

FIG. 1 is a graph showing the XRD results of the boron nitride powder prepared according to Examples 1 to 4.

FIG. 2 is a graph showing the nitrogen adsorption results of the boron nitride powder prepared according to Examples 1 to 4.

ADVANTAGEOUS EFFECTS

The porous boron nitrogen of the present invention may be usefully used in various application fields requiring relatively large pores, by including micropores with a diameter less than 2 nm and mesopores with a diameter of 2 nm or more.

And, according to the preparation method of boron nitride of the present invention, porous boron nitride having pores and specific surface areas of various sizes according to the application may be easily prepared by a simple method.

DETAILED DESCRIPTION OF THE EMBODIMENTS

The porous boron nitride of the present invention comprises micropores with a diameter of less than 2 nm and mesopores with a diameter of 2 to 50 nm.

And, the present invention provides a method for preparing porous boron nitride comprising the steps of: mixing at least one boron source selected from boron or boron-containing compounds with at least one nitrogen source selected from nitrogen or nitrogen-containing compounds;

heating the mixture and reacting it with halogen gas; and heating the reaction mixture under hydrogen atmosphere.

Hereinafter, the porous boron nitride and a method of preparing the same will be explained in detail with reference to drawings.

According to one aspect of the invention, provided is porous boron nitride comprising micropores with a diameter of less than 2 nm and mesopores with a diameter of 2 to 50 nm.

The porous boron nitride of the present invention may be obtained by a similar method to carbide derived carbon (CDC). The carbide derived carbon is prepared by thermochemically reacting a carbide compound with halogen-containing gas to extract, elements other than carbon in the carbide compound, and is drawing attention because it exhibits satisfactory properties as hydrogen storage material and electrode material compared to the existing activated carbon.

Although porous boron nitride having micropores less than 2 nm is known, porous boron nitride having mesopores of 2 nm or more has not been reported yet.

As used herein, micropores mean pores having a diameter less than about 2 nm, and mesopores mean pores having a diameter of about 2 nm or more, for example, about 2 to 50 nm.

On the surface of the porous boron nitride of the present invention, a plurality of pores that include both micropores and mesopores are formed.

As explained above, since the porous boron, nitride of the present invention includes both micropores less than 2 nm and mesopores of 2 nm or more, it may be usefully used in various application fields including the field requiring relatively large pores, for example, storage of larger gas than hydrogen, adsorption body of medical therapeutics or lubricant adsorbent, a catalyst, an electrode of a super capacitor, a filter, and the like, as well as storage and adsorption of small gas such as hydrogen.

And, in the porous boron nitride of the present invention, the volume fraction of the micropores may be about 30% or more, for example about 30 to about 90%, preferably about 40% to about 80%, based on the total volume of the pores including micropores and mesopores. The volume of the pores is measured by introducing nitrogen gas from 0 to 1 atm and converting the amount of adsorbed nitrogen into volume, while maintaining a constant temperature, for example, maintaining 77K using liquid nitrogen. Wherein, the volume ratio of the pores may be calculated by dividing the volume of the pores by the total, volume, based on the pores full of gas.

According to one example of the invention, the porous boron nitride may comprise micropores in the content of about 0.1, to about 0.4 cm$^3$/g, and comprise mesopores in the content of about 0.4 to about 0.7 cm$^3$/g.

According to one embodiment of the invention, the porous boron nitride may have specific surface area of about 300 m$^2$/g or more, for example, about 300 to about 1,200 m$^2$/g, preferably about 500 to about 1,200 m$^2$/g, more preferably about 600 to about 1,000 m$^2$/g. The specific surface area may be calculated by the following Calculation Formula 1, on the assumption that nitrogen is adsorbed into a monomolecular layer under each pressure condition while introducing nitrogen gas from 0 atm to 1 atm, while maintaining a constant temperature, for example, maintaining 77K using liquid nitrogen.

$$SSA = V_{mono}/22400 * \sigma * N = 4.35 \, V_{mono} \quad \text{[Calculation Formula 1]}$$

(SSA=specific surface area [m$^2$/g], $V_{mono}$=measurement volume of nitrogen adsorbed into a monomolecular layer per gram of pore [m$^3$/g], 22400=volume of 1 mol nitrogen [m$^3$/mol], σ=cross sectional area of nitrogen [m$^2$/atom], N=Avogagaro's number [atom/mol])

The porous boron nitride may be obtained by mixing at least one boron source selected from boron or boron-containing compounds with at least one nitrogen source selected from nitrogen or nitrogen-containing compounds, heating the mixture to form a compound, and extracting elements other than boron and nitrogen, as described in detail below.

According to another aspect of the invention, provided is a method for preparing porous boron nitride comprising the steps of: mixing at least one boron source selected from boron or boron-containing compounds with at least one nitrogen source selected from nitrogen or nitrogen-containing compounds; heating the mixture and reacting it with halogen gas; and heating the reaction mixture under hydrogen atmosphere.

According to one example of the invention, the boron source may be a boron metal compound such as $TiB_2$, and die nitrogen source may be a nitrogen metal compound such as TiN.

The compositional ratio of the boron source and the nitrogen source may be controlled such that the stoichiometry of the boron atom (B) and the nitrogen atom (N) may substantially become 1:1, namely, a boron-nitride bond may be made.

Conventionally, porous boron nitride was synthesized by mixing highly porous carbon material with boron oxide and then substituting at high temperature of about 1,500° C. under nitrogen atmosphere. Alternatively, a template method using a boron precursor wherein zeolite, highly porous carbon material is used as a parent body was known. However, these methods have disadvantages in that synthesis should be progressed at very high temperature, an expensive precursor is required, and high purify cannot be obtained without appropriate post-treatment. However, according to the method of preparing porous boron nitride of the present invention, porous boron nitride having pores and specific surface areas of various sizes according to the application may be easily prepared at relatively low temperature using an inexpensive precursor by a simple method.

According to one embodiment, of the invention, simultaneously with or after the step of mixing the boron source with the nitrogen source, a pulverization process may be conducted. The pulverization process may be conducted, for example, using a high energy ball mill. By using the high energy ball mill, the mixture of the boron source and the nitrogen source may be more uniformly mixed, and since the mixture is pulverized with higher energy than a common bail mill, the amount of defects may be increased to stably prepare porous material.

When pulverization is conducted using the high energy ball mill, for example, means such as an attritor mill, a planetary mill or a horizontal mill and the like may be used, and it is preferable to conduct dry pulverization at a BPR (ball-to-power ratio) of about 10:1 or more, and a milling speed of about 50 rpm or more.

The step of reacting the mixture with halogen gas may be conducted at a temperature of about 300 to about 1,200° C. for about 5 minutes to about 5 hours, preferably about 600 to about 800° C. for about 1 to about 4 hours. Wherein, the halogen gas used may be preferably chlorine gas.

By reacting the mixture with halogen gas, elements other than boron and nitrogen are extracted in the mixture, thus forming pores at the sites of these elements, thereby obtaining porous boron nitride.

According to one embodiment of the invention, after the step of reacting the compound, represented by the Formula 1 with halogen, gas, the step of heating at a temperature of about 400 to about 1,000° C., preferably about 400 to about 800° C. under hydrogen atmosphere is conducted, thereby removing remaining halogen gas.

And, according to one embodiment of the invention, after the step of heating under hydrogen, atmosphere to remove remaining halogen gas, the step of activating pores may be further conducted.

By conducting the step of activating pores, more pores may be generated on the surface, or the diameter of pores may be increased, thus more increasing surface area per unit mass.

According to one embodiment of the invention, the step of activating pores may be conducted by heating porous boron nitride powder until a specific temperature, for example, about 25 to about 1,000° C. is reached, in the atmosphere of at least one gas selected from the group consisting of inert gas such as He or Ar and $N_2$ gas. and heating at the reached temperature for a specific time, for example, about 10 minutes to about 2 hours, using carbon dioxide gas ($CO_2$). By using inert gas before introducing carbon dioxide, pore activation may be effectively achieved.

Hereinafter, the present invention will be explained in detail with reference to the following examples. However, these examples are only to illustrate the invention, and the scope of the invention is not limited thereto.

EXAMPLE

Example 1

1.0788 g of $TiB_2$ and 1.9212 g of TiN were prepared and mixed so that the ratio of B and N may be close to 1:1 and the stoichiometric ratio of the elements may form a Boron-Nitride bond.

The mixture was dry-pulverized with a Planetary mill at 250 rpm at BPR (Ball-to-Powder Ratio) of 30:1 for 20 hours using a YSZ (Yittrium Stabilized Zirconia) ball.

3.00 g of the prepared compound powder was treated with chlorine gas at 500° C. for 3 hours, and then, heated at 600° C. for 2 hours under hydrogen atmosphere, thereby removing remaining chlorine gas to obtain porous boron nitride powder.

Examples 2 to 4

Porous boron nitride powder was prepared by the same method as Example 1, except that the chlorine gas treatment temperature was changed.

The specific surface area (SSA), the volume of micropores and the volume of mesopores of the porous carbon according to each Example were measured and the results are shown in the following Table 1.

TABLE 1

| Example No. | Chlorine gas treatment temperature (° C.) | Raw materials(gram/batch) $TiB_2$ | Raw materials(gram/batch) TiN | Specific surface area ($m^2/g$) | micropores ($cm^3/g$) | mesopores ($cm^3/g$) |
|---|---|---|---|---|---|---|
| 1 | 500 | 1.0788 g | 1.9212 g | 334 | 0.14 | 0.34 |
| 2 | 600 | | | 960 | 0.38 | 0.28 |
| 3 | 700 | | | 795 | 0.31 | 0.18 |
| 4 | 800 | | | 570 | 0.22 | 0.18 |

From the Table 1, it can be seen that total specific surface area (SSA) is in proportion to the volume of micropores.

FIG. 1 is a graph showing the XRD results of the porous boron nitride powder prepared according to Examples 1 to 4.

Referring to FIG. 1, it can be seen that the powder prepared according Examples 1 to 4 has a typical turbostractic boron nitride structure wherein a (002) peak and a (10) peak appear. It can be also seen that Example 2 exhibits most amorphous property.

FIG. 2 is a graph showing the nitrogen adsorption results of the porous boron nitride powder prepared according to Examples 1 to 4. In FIG. 2, ad denotes adsorption, and de denotes desorption.

Referring to FIG. 2, Example 1 exhibits a type IV adsorption curve according to IUPAC classification, proving that it has a mesoporous structure. To the contrary, Examples 2, 3 and 4 exhibit type I and type IV simultaneously, which means a structure wherein both micropores and mesopores exist.

The hysteresis loops shown in the desorption curve of Examples 2 and 3 also prove that they have mesoporous structures.

The invention claimed is:

1. A method for preparing porous boron nitride comprising the steps of:
   mixing $TiB_2$ with TiN;
   heating the mixture and reacting it with halogen gas; and
   heating the reaction mixture under hydrogen atmosphere.

2. The method according to claim 1, further comprising the step of pulverizing the mixture, simultaneously with or after the step of mixing the boron source with the nitrogen source.

3. The method according to claim 2, wherein the step of pulverizing the mixture is conducted using a high energy ball mill.

4. The method according to claim 1, wherein the halogen gas is chlorine($Cl_2$) gas.

5. The method according to claim 1, wherein the step of reacting the mixture with halogen gas is conducted at a temperature of 300 to 1,200° C. for 5 minutes to 5 hours.

6. The method according to claim 1, wherein the step of heating under hydrogen atmosphere is conducted at a temperature of 400 to 1,000° C.

* * * * *